(12) United States Patent
Ruehl

(10) Patent No.: US 9,147,015 B2
(45) Date of Patent: Sep. 29, 2015

(54) COMPUTER-IMPLEMENTED METHOD FOR CREATING A MODEL OF A TECHNICAL SYSTEM

(75) Inventor: Martin Ruehl, Altenbeken (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 526 days.

(21) Appl. No.: 13/227,984

(22) Filed: Sep. 8, 2011

(65) Prior Publication Data
US 2013/0066604 A1    Mar. 14, 2013

(51) Int. Cl.
*G06G 7/48* (2006.01)
*G06F 17/50* (2006.01)

(52) U.S. Cl.
CPC ........ *G06F 17/5009* (2013.01); *G06F 2217/02* (2013.01)

(58) Field of Classification Search
CPC ....... G06F 17/50; G06F 7/60; G06F 17/5009; G06F 9/02; G06F 2217/02
USPC .................................................. 703/2, 7, 6
See application file for complete search history.

(56) References Cited

U.S. PATENT DOCUMENTS

| | | | |
|---|---|---|---|
| 8,065,252 B2 * | 11/2011 | Li et al. | 706/45 |
| 2007/0244672 A1 * | 10/2007 | Kjaer | 703/2 |
| 2010/0205586 A1 * | 8/2010 | Mun | 717/140 |

OTHER PUBLICATIONS

El-Hajj, Ali et al., "On Using Spreadsheets for Logic Networks Simulation", Nov. 1998, IEEE Transactions on Education, vol. 41, No. 4. IEEE.*

* cited by examiner

*Primary Examiner* — Kamini S Shah
*Assistant Examiner* — Cedric D Johnson
(74) *Attorney, Agent, or Firm* — Muncy, Geissler, Olds & Lowe, P.C.

(57) ABSTRACT

A computer-implemented method for creating a model of a technical system is provided. The model includes at least two model components of a same class, and each model component has at least one input and/or at least one output. Links are established between the inputs and the outputs of the model components. At least one first selection of inputs and/or outputs of at least one of the model components is made, and at least one additional, second selection of inputs and/or outputs of at least one of the model components is made, and the inputs and/or the outputs of the first selection are displayed in list form in a first column of a display, and the inputs and/or the outputs of the second selection are displayed in list form in a second column of the display.

14 Claims, 5 Drawing Sheets

COMPUTER-IMPLEMENTED METHOD FOR CREATING A MODEL OF A TECHNICAL SYSTEM

BACKGROUND OF THE INVENTION

1. Field of the Invention

The invention relates to a computer-implemented method for creating a model of a technical system on a computer which has at least one display. The model can include at least two model components of the same class, and each model component can have at least one input and/or at least one output, whereby links are established between the inputs and outputs of the model components.

2. Description of the Background Art

Computer-implemented methods for creating a model are known and are a permanent part of mathematical/physical modeling of a technical system, one of the best known methods being the computer-assisted creation of block diagrams. Block diagrams of this type have different blocks as model components, each block having a certain functionality which may include, for example the functionality of a data source—for example in the form of a mathematically simulated signal generator—which may have the functionality of a data sink, for example, a recording of data obtained via the input on a storage medium of the computer, and which may have, for example, a transmission function. Model components of the latter type output a signal via the block output which is the result of the signal which is modified according to the transmission behavior of the block and which the corresponding block has received via one of its inputs. In the case of block diagrams, links in the form of signal lines that indicate how signals flow within the block diagram are provided between the inputs and outputs of the model components designed as blocks. A computer-implemented method of this type for creating a model is offered, for example, by the MATLAB modeling environment, together with the Simulink graphical user interface from The Math Works, Inc.

Other computer-implemented methods for creating a model may make do without the classic linking of model components via signal lines. A relationship between the different model components may then be identified, for example, simply by using corresponding names of state variables. The specific implementation of links between model components is of no consequence in this case. The links between the model components are generally used entirely for the purpose of demonstrating the effective relationship between the different model components.

Generally, when a computer-implemented method for creating a model on a computer is discussed, it is typically meant that the method may be automated or carried out with the aid of a computer. The computer may be a commercially available PC (personal computer) having an arithmetic unit, main memory and mass storage of an input unit and a display, a workstation or even a distributed work environment; the specific equipment of the computer is of no consequence.

Models of technical systems or of parts of technical systems are frequently created in order to interact with real technical systems or with parts of real technical systems, for example in developing control units or in developing controllers/regulators to be implemented on control units. The control unit is often concretely provided in the form of hardware to be tested which has suitable I/O interfaces. To reliably and easily test the control unit, the environment of the control unit (physical process) is modeled with the aid of a mathematical model in a simulator which is able to calculate the physical process in real time. The variables to be detected by the control unit using measurement and to be output by the control unit as the response are output or detected by measurement via appropriately programmable I/O interfaces of the simulator. The test method described above is also referred to as hardware-in-the-loop simulation. Other applications for creating models of technical systems are combined, for example, under the term "rapid control prototyping." To return to the aforementioned structure, the control unit and the regulator implemented on the control unit are simulated, in practical terms, and tested together with the real technical process. In both test scenarios for which the model of a technical system or part of a technical system is to be created, the different areas of the test system, i.e., the control unit hardware, I/O interfaces of the simulator and the mathematical model of the technical process on the simulator, are handled separately from each other.

When the model includes at least two model components of the same class, it is typically understood that the model components come from only one of the areas illustrated above, i.e., they are either model components of the mathematical model or model components of an I/O interface or model components of actually existing hardware. The present case does not concern models which come from multiple areas of a previously demonstrated test and development system but only model components which come from one of these areas. Model components that come from one of the areas illustrated above—actually existing hardware, actually existing I/O interfaces or parts of the mathematical model—are model components of the same class.

Models of technical systems may be very comprehensive and—depending on the complexity of the underlying technical system—may contain several thousand model components of the same class. Models of this type may be very unclear, since they extend over a large area on the computer display, and therefore only a small portion of the model as a whole may often be viewed by the computer user. This problem is even worse when the model of the technical system extends over multiple hierarchical levels. In the case of a model created as a block diagram, this means, for example, that model components provided as blocks are nested within each other, i.e., a block has a plurality of blocks on an underlying modeling level, and these blocks, in turn, may include multiple additional blocks on even lower modeling levels. The viewer of a model of this type may gain an overview of the functional structure thereof only on one hierarchical level of a single model component, which makes it more difficult to gain an overall understanding of the modeled relationship or relationship still to be modeled.

SUMMARY OF THE INVENTION

It is therefore an object of the present invention to provide a computer-implemented method for creating a model of a technical system which may also be used to handle complex and comprehensive technical systems with improved clarity.

According to an embodiment of the invention, the illustrated object is initially and largely achieved in the method under discussion in that at least one first selection of inputs and/or outputs of at least one of the model components is made, and at least one additional, second selection of inputs and/or outputs of at least one of the model components is made, and that the inputs and/or the outputs of the first selection are subsequently displayed in list form in a first column of the display, and the inputs and/or the outputs of the second selection are displayed in list form in a second column of the display. The advantage of the method according to the invention is that only selections of inputs and/or outputs of the model components may be made at all, and the model as a whole does not necessarily have to be manipulated, i.e., including all inputs and/or outputs of all model components. The creation or even the viewing of the model may be limited to only the inputs and/or outputs of model components that are of interest by making the aforementioned selections, which alone offers a considerable advantage over the known block diagrams. A further advantage is that the structuring of the model may be broken down into model components by selecting inputs and/or outputs of at least two model components.

It is conceivable, for example, to use the method according to the invention in addition to a conventional method for creating a model of a technical system, it being possible for this known method to be, for example, the creation of a conventional block diagram. It is now possible to provide all inputs and/or outputs of all model components present as blocks in this example for selection and to display at least two selections of inputs and/or outputs made according to the invention in list form in two adjacent columns according to the invention. These two columns may be displayed parallel to each other—vertically or horizontally—on the computer display, for example in a window, and they may also be moved, for example, relative to each other with the aid of a scroll bar that is known per se.

To use the method according to the present invention to enable a model to be completely functionally created, it is provided in an embodiment that the inputs and/or outputs of the first selection in the first column can be at least partially linked to the outputs and/or the inputs of the second selection in the second column. This linkage may be graphically established by a link using lines, it being possible to create the corresponding links in a known manner by dragging a mouse pointer.

In an embodiment, the method described above is expanded in that n selections of inputs and/or outputs are made from the inputs and/or outputs of at least one of the model components, and each selection of the n selections is displayed in a separate column on the display, in this case as well, the n columns can run parallel to each other and are able to be moved relative to each other as much as possible, and they are also moved for the purpose of comparing inputs and/or outputs which are to be linked across columns.

To be able to make the first selection, the second selection and possible additional selections of inputs and/or outputs of at least one of the model components, it is provided in an embodiment of the computer-implemented method according to the invention that all inputs and all outputs of the model components of the model can be displayed in a separate view on the computer display and are available there for selection. This separate selection of all inputs and outputs of the model components of the model may preferably be organized according to model components, organized according to inputs, organized according to outputs or also organized according to hierarchical levels. The separate selection of the inputs and outputs of the model components or, in any case, the inputs and outputs that are to be provided for selection at all, may be displayed, for example, in a tree structure in such a way that, the inputs and the outputs of the relevant model component are listed, for example, under the name of each model component. A selection from this separate display of all inputs and outputs of the model components is made in an embodiment in that the selected inputs and/or outputs may be dragged to the first column, the second column or the nth column by clicking the mouse, or the particular column in which the relevant input or output is to appear may be noted in the separate view behind the selected input or output.

According to an embodiment of the computer-implemented method, the first selection, the second selection and each additional selection of inputs and/or outputs may also be made according to certain rules. In a first embodiment of the method, for example, it is provided that only outputs or only inputs of at least one of the model components are selected as the first selection of inputs and/or outputs of at least one of the model components, and that only inputs or only outputs of at least one of the model components are selected as the second selection of inputs and/or outputs of at least one of the model components. As a result of this selection method, it is very easily possible to display the inputs and the outputs of one or more model components separately in different columns. This is advantageous for the user if, for example, a stringent signal flow is to be implemented in the column-type display according to the invention. Furthermore, this selection method may be easily automated, in particular it may be easily automated even if certain model components were previously selected which are to be subjected to this method.

This method may be particularly easily automated if all inputs or all outputs of both the first model component and the second model component—or even possible additional model components—are selected as the first selection of inputs and/or outputs of at least one of the model components, and if all inputs or all outputs of both the first model component and the second model component—or even possible additional model components—are correspondingly selected as the second selection of inputs and/or outputs of at least one of the model components, since this makes it unnecessary to decide whether certain inputs and/or outputs should not be selected and remain ignored for selection.

In an alternative embodiment of the computer-implemented method according to the invention, it is provided that all inputs and all outputs of the first model component are selected as the first selection of inputs and/or outputs of at least one of the model components, and that all inputs and all outputs of the second model component are selected as the second selection of inputs and/or outputs of at least one of the model components. Due to this equally easy-to-implement embodiment of the method, it is possible to achieve a component view of the model or the model components that is arranged in columns, which may also be advantageous if these model components are located at entirely different points at a distance from each other, for example in a corresponding block diagram, which the method naturally does not take into account and does not have to take into account.

According to an embodiment of the method, an expansion to any number of model components is provided, so that this refinement is characterized in that a total of n selections is made for n model components, each selection including the inputs and the outputs of one of the n model components and each selection is displayed in one of n columns on the display.

Independently of the embodiments of the method described above, it is provided in an embodiment that the inputs and/or outputs of at least one of the model components displayed in one column of the display can be automatically grouped according to model components, for example by graphically grouping the inputs and/or outputs belonging to a model component, the inputs and/or outputs preferably being separately selectable. The inputs and/or outputs of at least one of the model components displayed in a column of the display are preferably organized hierarchically, preferably in the manner of a nested structure. This enables the user to comprehend, for example the hierarchical structure of a block diagram, it being possible to use the advantages of the parallel list-type display of inputs and/or outputs at the same time.

In a further embodiment of the method, it is provided that the inputs and/or outputs of at least one of the model components displayed in the first column of the display, and the inputs and/or outputs of at least one of the model components displayed in the second column of the display can be automatically situated relative to each other in such a way that the inputs and/or outputs which are linked together by lines in different columns are located as close to each other as possible. This is achieved with the aid of an optimization operation in which the sum of the position deviations or the sums of the squares of the position deviations are minimized at least locally.

Specifically, there are a plurality of ways in which the computer-implemented method according to the invention for creating a model of a technical system may be designed and refined on a computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
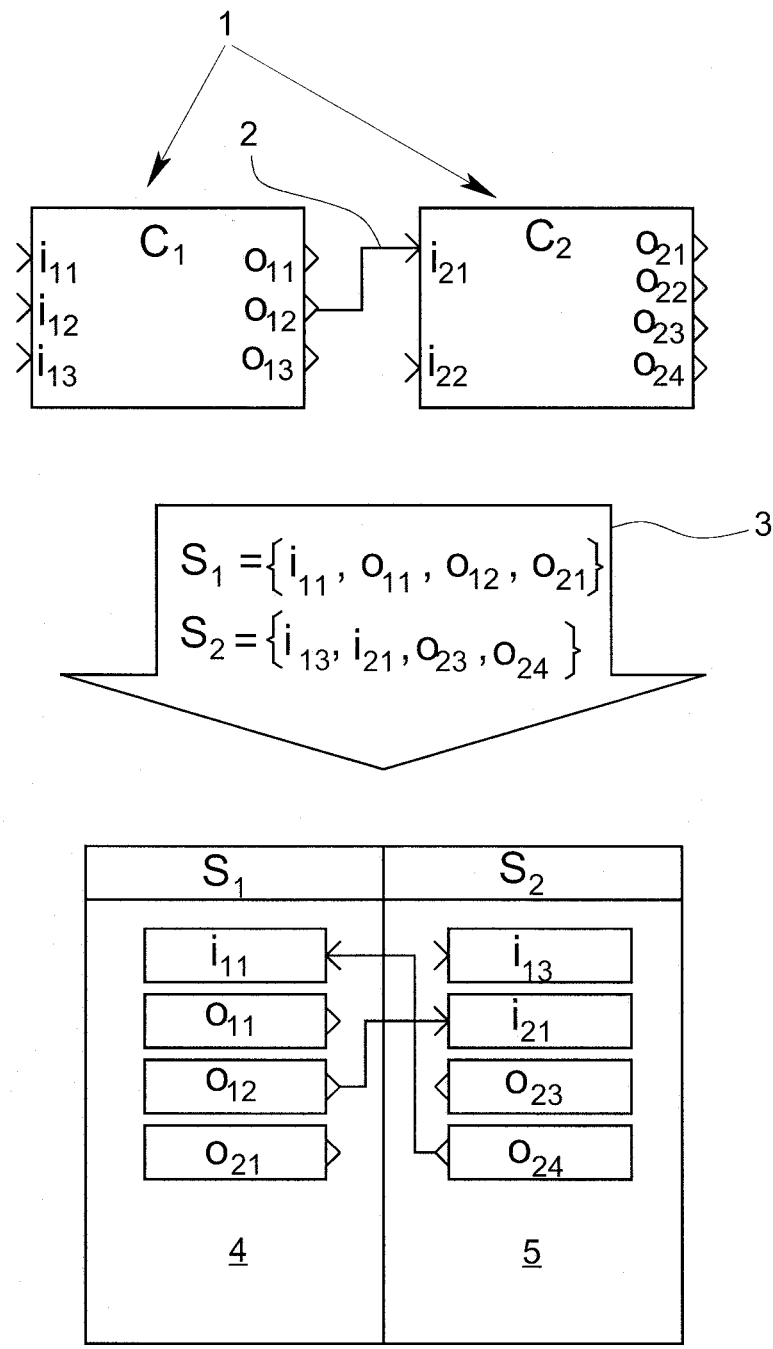
FIG. 1 shows a schematic representation of the computer-implemented method for creating a model of a technical system, including a first solution of inputs and/or outputs of a total of two model components of the model.

FIGS. 1 though 5 show a schematic representation of different embodiments of the computer-implemented method according to the invention for creating a model 1 of a technical system, which is not illustrated in further detail here, on a computer. The computer, which is not expressly illustrated here, may be a commercially available computer or computer system which has an arithmetic unit, memory, a user interface (keyboard, mouse, etc.) and at least one display, for example in the form of a monitor.

Figure 2:
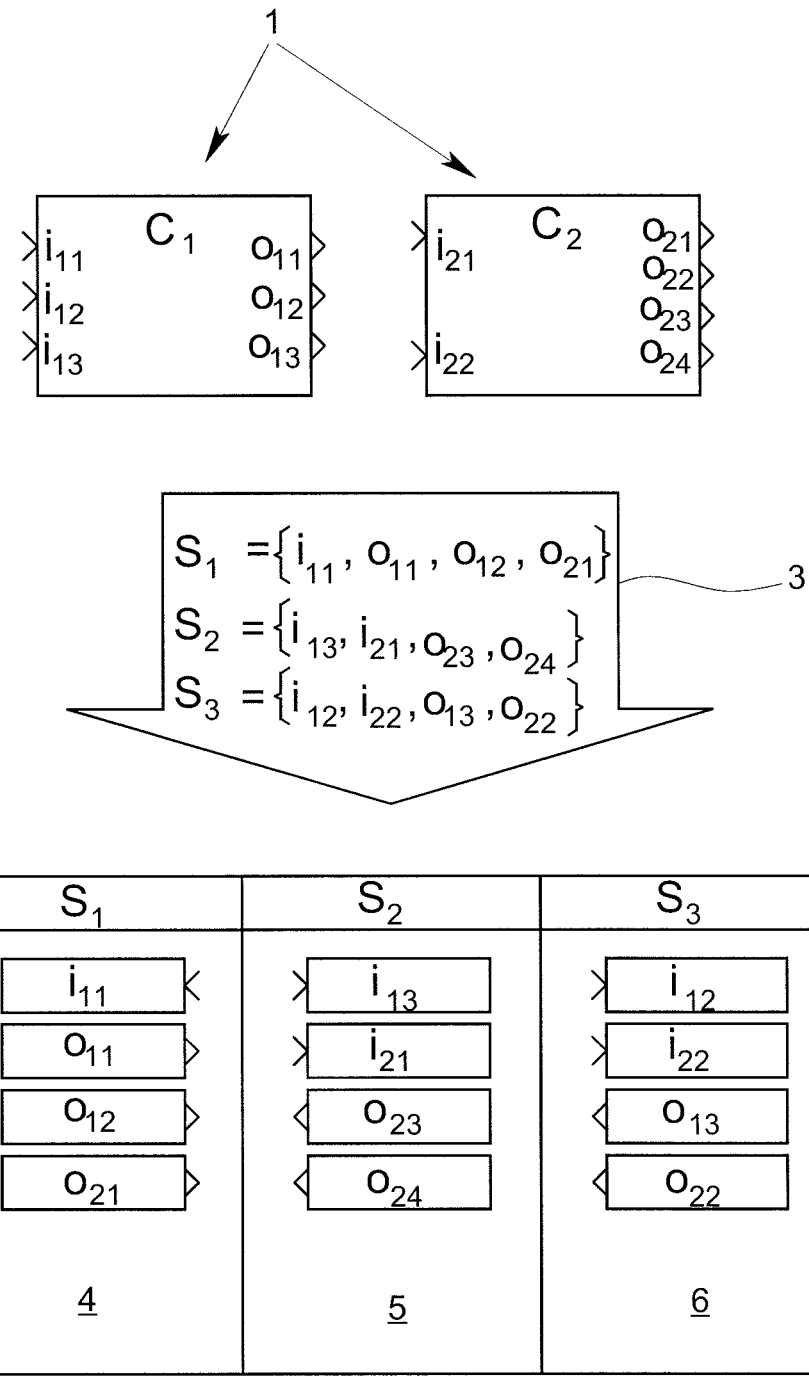
FIG. 2 shows an exemplary embodiment of the method according to the invention according to FIG. 1, this time, however, including a total of three selections of inputs and/or outputs of the two model components and displaying the selections in three columns of the display.
Figure 3:
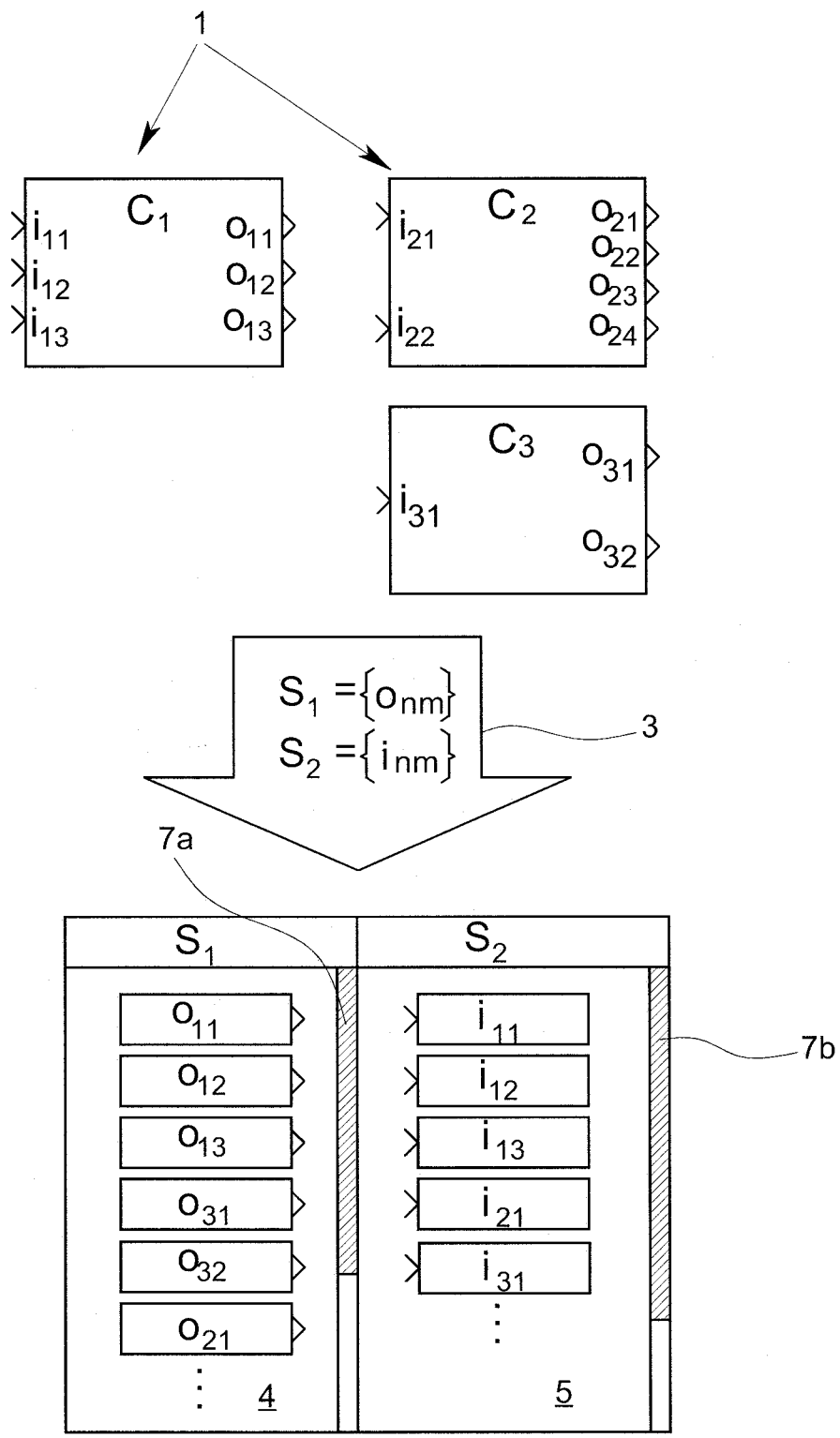
FIG. 3 shows selections made according to inputs and outputs of the model component and assignments to different columns.

In FIGS. 1, 2, 4 and 5, model 1 includes precisely two model components $C_1$ $C_2$ of the same class; in the exemplary embodiment according to FIG. 3, model 1 includes three model components $C_1$, $C_2$, $C_3$ of the same class. Realistic models of technical systems frequently do not have just a few model components, but instead they may have several thousand or even tens of thousands of model components which are distributed on a model plane and may also be hidden in subordinate hierarchies of the model components. Further, the different model components in common models may be situated at a great distance from each other and thus do not have as close a spatial reference to each other as illustrated in FIGS. 1 through 5.

Model components $C_1$, $C_2$, $C_3$ have different inputs $i_{nm}$ and different outputs $o_{nm}$. Input $i_{1m}$ is the mth input of first model component $C_1$, and input $i_{2n}$ is the nth input of second model component $C_2$. Output $o_{1n}$ is the nth output of first model component $C_1$, and output $i_{2n}$ is the nth output of second model component $C_2$, etc.

In the present case, model components $C_1$, $C_2$, $C_3$ are blocks of a model 1 which are formulated as a block diagram and which have source, sink or transmission functionalities; the precise functionality is of no consequence here. To correlate different model components $C_1$, $C_2$, $C_3$, links are established between inputs $i_{nm}$ and outputs $o_{nm}$ of model components $C_1$, $C_2$, $C_3$, as illustrated by way of example in FIG. 1 on the basis of a link 2 between second output $O_{12}$ of first model component $C_1$ and first input $i_{21}$ of second model component $C_2$. The precise way in which an effective relationship between different model components $C_1$, $C_2$, $C_3$ is established is not of any great importance to the method described below; the only important consideration is the fact that links 2 may be established between different inputs $i_{nm}$ and different outputs $o_{nm}$ of model components $C_1$, $C_2$, $C_3$.

Common to the methods illustrated in FIGS. 1 through 5 is the fact that, within the framework of a selection method 3, a first selection $S_1$ of inputs $i_{nm}$ and/or outputs $o_{nm}$ of at least one of model components $C_1$, $C_2$, $C_3$ is made, and at least one second selection $S_2$ of inputs $i_{nm}$ and/or outputs $o_{nm}$ of at least one of model components $C_1$ $C_2$, $C_3$ is made. Inputs $i_{nm}$ and/or outputs $o_{nm}$ of first selection $S_1$ are then displayed in list form in a first column 4 of the display, and inputs $i_{nm}$ and/or outputs $o_{nm}$ of second selection $S_2$ are displayed in list form in a second column 5 of the display. Thus, the method makes it possible to select certain inputs $i_{nm}$ and certain outputs $o_{nm}$ from different model components $C_1$, $C_2$, $C_3$—i.e., beyond the limits of model components—and to reorganize effected selections $S_1$, $S_2$, $S_3$, $S_n$ and display them directly close each other. It is thus possible to select only the inputs $i_{nm}$ and outputs $o_{nm}$ that are of interest for a certain operation from different model components $C_1$, $C_2$, $C_3$ of model 1 and to remove them from the overall context of complete model 1, so that a new view of a particular interesting aspect of model 1 is opened and greater clarity and better manageability are achieved for creating model 1.

Model components $C_1$, $C_2$, $C_3$ illustrated in FIGS. 1 through 5 are all model components of a mathematical model and thus represent model components of the same class. In other exemplary embodiments not illustrated here, the model components may be, for example, I/O interface components or images of actual hardware, i.e., hardware components, for example, hardware components of an actually existing control unit, and these components would also be model components of the same class—each viewed individually.

FIG. 1 shows that second output $O_{12}$ of first model component $C_1$ is linked to first input $i_{21}$ of second model component $C_2$ and that fourth output $O_{24}$ of second model component $C_2$ is linked to first input $i_{11}$ of first model component $C_1$. During selection method 3, two selections $S_1$, $S_2$ are made in the exemplary embodiment according to FIG. 1, first selection $S_1$ including both inputs and outputs of first model component $C_1$ as well as an output $O_{21}$ of second model component. Second selection $S_2$ includes an input $i_{13}$ of first model component $C_1$ and an input $i_{21}$ of second model component $C_2$ and two outputs $O_{23}$, $O_{24}$ of second model component $C_2$.

The exemplary embodiment according to FIG. 2 differs from the exemplary embodiment according to FIG. 1 in that not only a first selection $S_1$ and a second selection $S_2$ are made, but also a third selection $S_3$ is made from inputs $i_{nm}$ and outputs $o_{nm}$ of first model component $C_1$ and second model component $C_2$. This third selection $S_3$ is displayed in list form in a third column 6 of the display, it also being possible to now also establish links between different inputs $i_{nm}$ and outputs $o_{nm}$ of selections $S_1$, $S_2$, $S_3$ made. In n effected selections $S_1$, ..., $S_n$ of inputs $i_{nm}$ and outputs $o_{nm}$ of model components $C_1$, $C_2$, each of selections $S_1$, ... $S_2$, would be displayed in n columns of the display.

FIG. 3 shows that only outputs $o_{nm}$ of model components $C_1$, $C_2$, $C_3$ have been selected in first selection $S_1$, and that only inputs $i_{nm}$ of model components $C_1$, $C_2$, $C_3$ have been selected in second selection $S_2$ and displayed in list form in columns 4, 5. Scroll bars 7a, 7b may be used to move selections $S_1$, $S_2$ in columns 4, 5 relative to each other, which is advantageous, in particular when selections $S_1$, $S_2$ of inputs $i_{nm}$ and outputs $o_{nm}$ are unable to be completely displayed in columns 4, 5 of the display.

Figure 4:
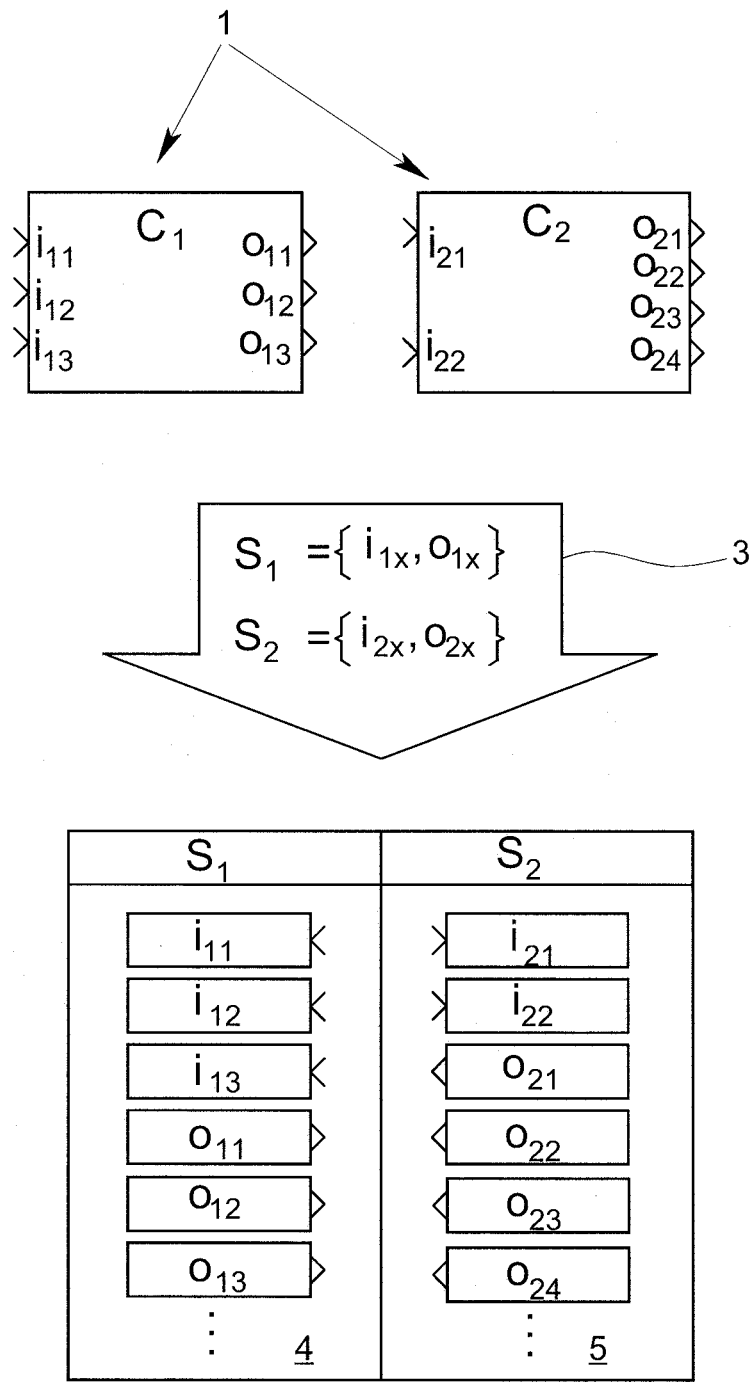
FIG. 4 shows a method as an alternative to the one illustrated in FIG. 3, including a first selection and a second selection of inputs and/or outputs, differentiated according to model components.

The method according to FIG. 4 makes it possible to achieve a selective component view of the overall model. In selection method 3, all inputs $i_{1x}$ and all outputs $o_{1x}$ of first model component $C_1$ are selected as first selection $S_1$, and all inputs $i_{2x}$ and all outputs $o_{2x}$ of second model component $C_2$ are selected as second selection $S_2$ and displayed in columns 4, 5 of the display. Of course, this is particularly useful if model 1 includes not only two model components $C_1$, $C_2$, but also several hundreds or thousands of model components, as in model 1 occurring in practice. It is then entirely understandable that the list-type display of the effected selection in columns 4 and 5 provides greater clarity and, by making selections $S_1$ and $S_2$, attention may be drawn only to the interesting inputs and outputs of model components $C_1$ and $C_2$ under consideration. The selection principle according to FIG. 4 may, of course, be expanded to any number of model components, so that the inputs and outputs of n selected model components results in a total of n selections $S_1$, $S_2$, ..., $S_n$, which may ultimately be displayed in n columns and which may also be linked together therein.

Figure 5:
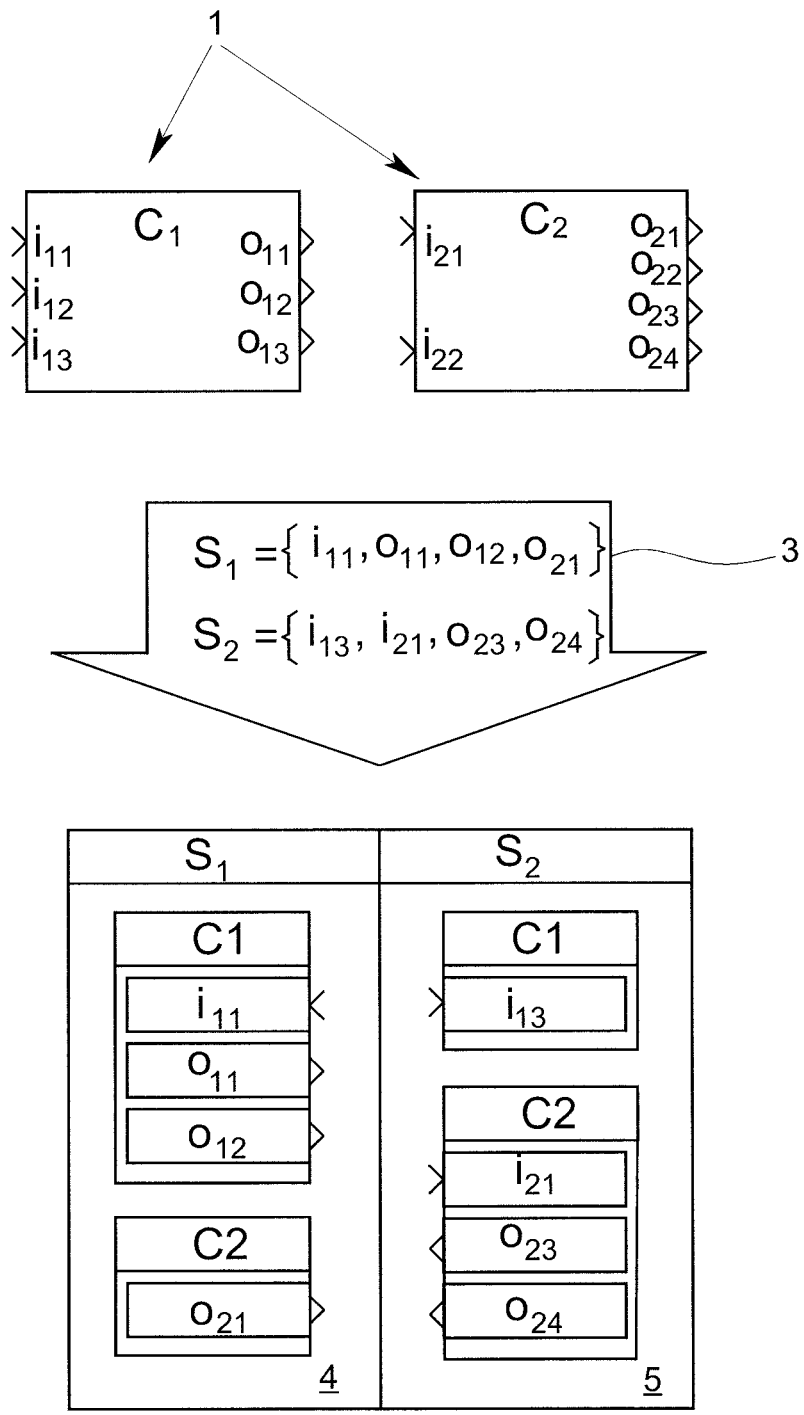
FIG. 5 shows the method according to the invention, in which the inputs and/or outputs displayed in one column of the display are grouped according to model components.

In the method illustrated in FIG. 5, inputs $i_{nm}$ and outputs $o_{nm}$ displayed in relevant columns $S_1$, $S_2$ of the display are automatically grouped according to model components $C_1$, $C_2$, so that the user of the method must deal only with selections $S_1$ and $S_2$ of inputs $i_{nm}$ and outputs $o_{nm}$, while also maintaining a component view of model 1. This addition of a component view to the method may naturally also be carried out using more than two selections in more than two columns of the display.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for creating a model of a technical system on a computer that has a display, the method comprising:

providing the model, the model including at least two model components of a same class, and each model component having at least one input and at least one output;

establishing links between the inputs and the outputs of a first model component and the inputs and the outputs of a second model component, such that the inputs and the outputs of the first model component are linked to the inputs and outputs of the second model component;

making a first selection of at least one of the inputs and/or the outputs of at least one of the model components;

making a second selection of inputs and/or outputs of at least one of the model component;

displaying the inputs and/or the outputs of the first selection in a list form in a first column of the display; and displaying the inputs and/or the outputs of the second selection in the list form in a second column of the display, wherein displaying the inputs and/or outputs of the first and second columns are automatically positioned close to each other to represent the linkage of the first and second model components and wherein the automatic positioning is performed by an optimization operation that includes minimizing a sum of position deviations or a sum of squares of position deviations of the linked inputs and/or outputs of the model components in the columns.

2. The method according to claim 1, wherein the inputs and/or the outputs of the first selection in the first column are at least partially linked to the outputs and/or the inputs of the second selection in the second column.

3. The method according to claim 1, wherein n selections of inputs and/or outputs are made from the inputs and/or outputs of at least one of the model components, and wherein each selection of the n selections is displayed in a separate column of the display.

4. The method according to claim 1, wherein only outputs or only inputs of at least one of the model components is selected as the first selection of inputs and/or outputs of at least one of the model components, and wherein only inputs or only outputs of at least one of the model components is selected as the second selection of inputs and/or outputs of at least one of the model components.

5. The method according to claim 4, wherein all outputs or all inputs of both the first model component and the second model component are selected as the first selection of inputs and/or outputs of at least one of the model components, and wherein all inputs or all outputs of both the first model component and the second model component are selected as the second selection of inputs and/or outputs of at least one of the model components.

6. The method according to claim 1, wherein all inputs and all outputs of the first model component are selected as the first selection of inputs and/or outputs of at least one of the model components, and wherein all inputs and all outputs of the second model component are selected as the second selection of inputs and/or outputs of at least one of the model components.

7. The method according to claim 6, wherein for n model components, n selections are made, each selection including the inputs and the outputs of one of the n model components, and each selection being displayed in one of n columns of the display.

8. The method according to claim 1, wherein the inputs and/or outputs of at least one of the model components displayed in a column of the display are automatically grouped according to model components.

9. The method according to claim 1, wherein the inputs and/or outputs of at least one of the model components displayed in a column of the display are organized hierarchically or in a nested structure.

10. The method according to claim 1, wherein the inputs and/or outputs of at least one of the model components displayed in the first column of the display and the inputs and/or outputs of at least one of the model components displayed in the second column of the display are automatically situated relative to each other such that the inputs and/or outputs linked to each other by signal lines in different columns are located as close together as possible.

11. The method according to claim 1, wherein the first selection includes at least one input and/or at least one output of both the first model component and the second model component, and wherein the second selection includes at least one input and/or at least one output of both the first model component and the second model component.

12. The method according to claim 1, wherein all of the inputs and/or outputs in a column of the display are grouped according to the respective model component in which the inputs and/or outputs are associated.

13. The method according to claim 1, wherein the links are established such that the outputs of the first model component are directly linked to the inputs of the second model component, and the outputs of the second model component are directly linked to the inputs of the first model component.

14. The method according to claim 1, wherein after the links are established, the first selection and the second selection are made.

* * * * *